A. P. O. MANICKE.
WATER WHEEL.
APPLICATION FILED SEPT. 22, 1915.
1,200,963.
Patented Oct. 10, 1916.
2 SHEETS—SHEET 1.
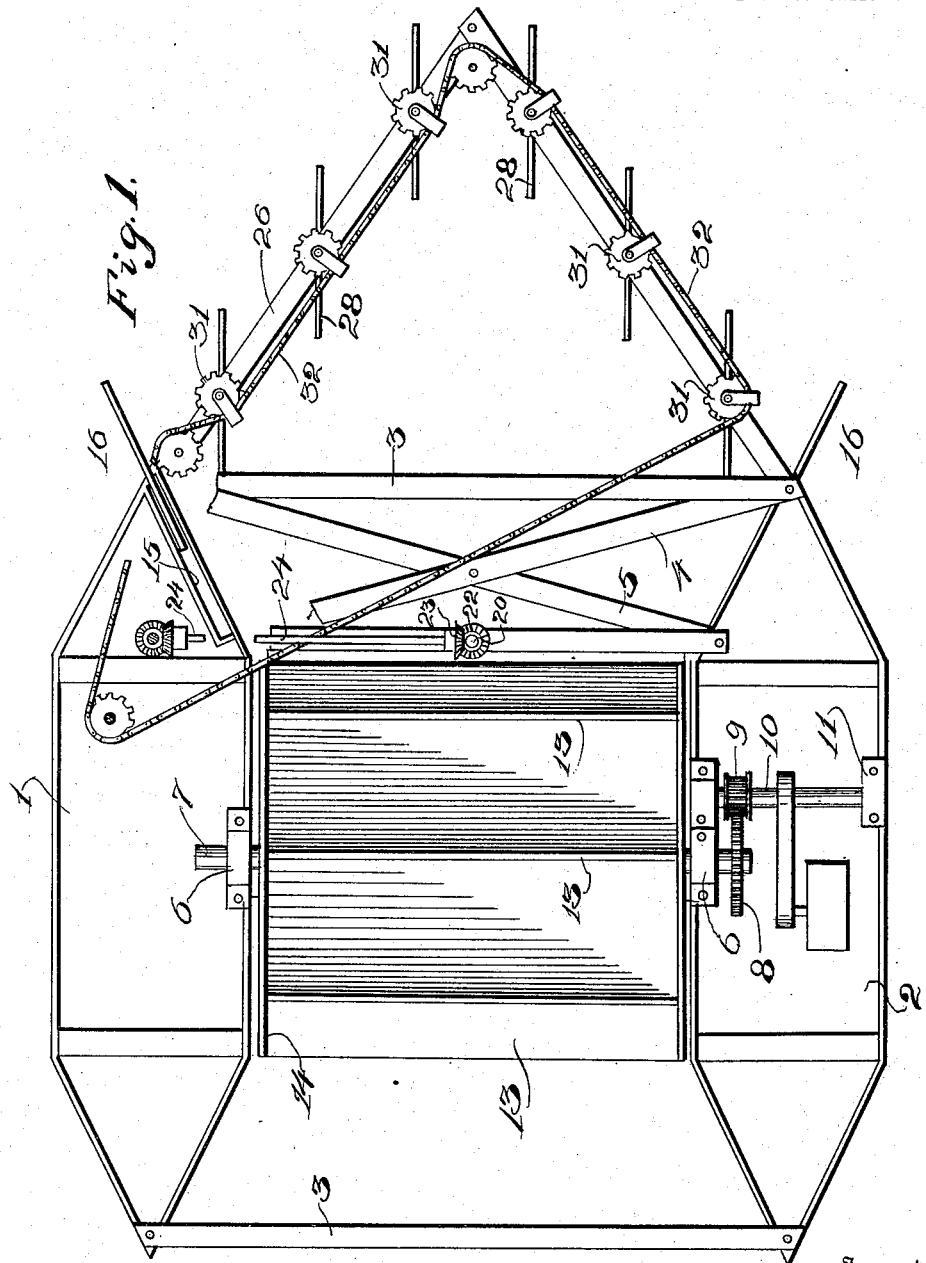
Witnesses
Inventor
A.P.O.Manicke.

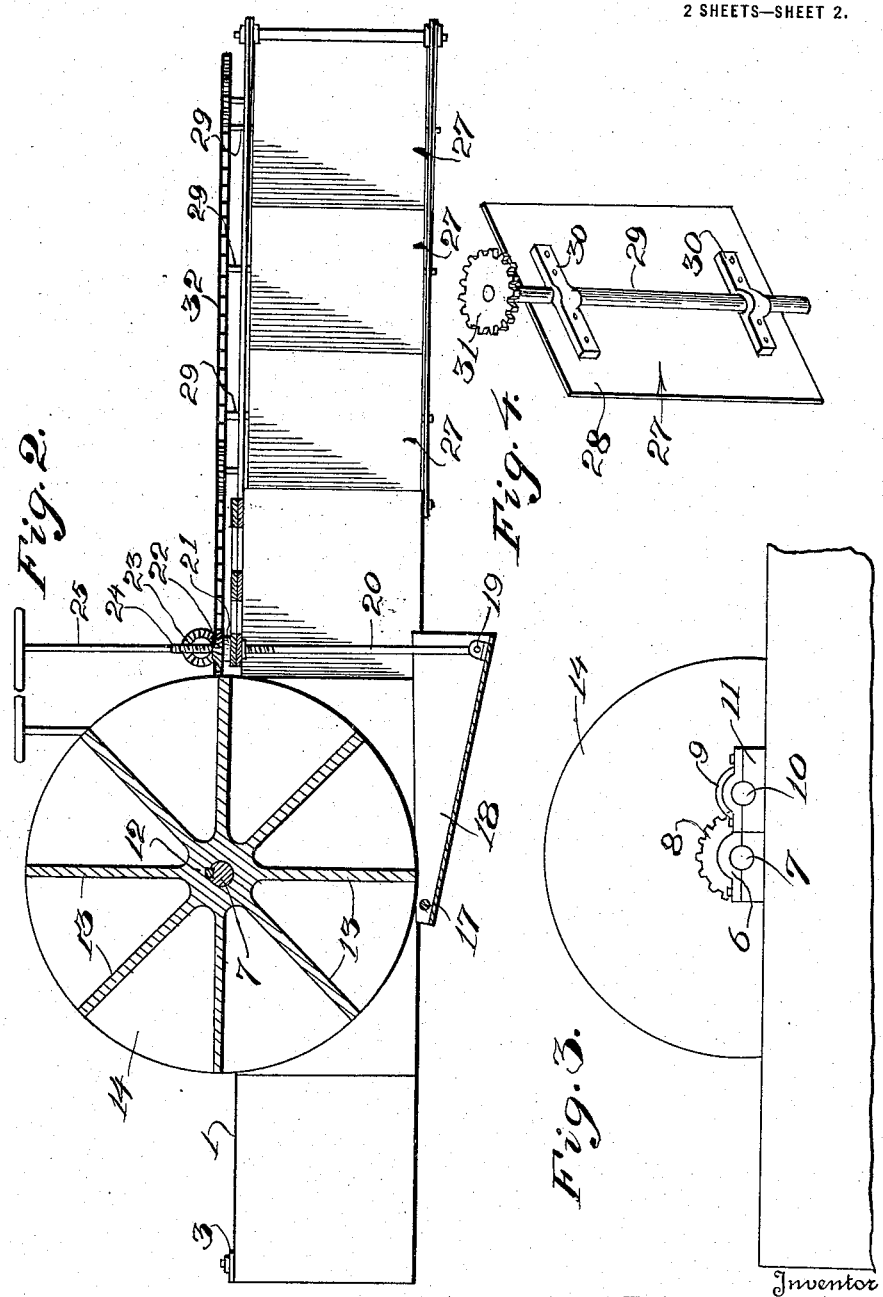

UNITED STATES PATENT OFFICE.

ALBERT P. O. MANICKE, OF PHILLIPSBURG, NEW JERSEY.

WATER-WHEEL.

1,200,963.

Specification of Letters Patent.

Patented Oct. 10, 1916.

Application filed September 22, 1915. Serial No. 52,036.

*To all whom it may concern:*

Be it known that I, ALBERT P. O. MANICKE, a subject of the Emperor of Germany, residing at Phillipsburg, in the county of Warren and State of New Jersey, have invented certain new and useful Improvements in Water-Wheels; and I do hereby declare the following to be a full, clear, and exact description of the invention, such as will enable others skilled in the art to which it appertains to make and use the same.

This invention relates to new and useful improvements in water wheels and the principal object of the device is to provide a power mechanism adapted to be anchored in a running stream so that the water flowing in the stream will rotate a power wheel in order to drive various appliances.

Another object of the invention is to provide a device supported on a float in such a way that the water will pass beneath the wheel, thereby causing the same to revolve.

A further object of the invention is to provide a device having a plurality of fins arranged so as to direct the water against the wheel in order that the power generated may be varied.

A further object of the invention is to provide a device provided with a plurality of gates which may be so arranged as to prevent floating objects from entering the wheel and damaging the same.

Still another object of the invention is to provide a means for simultaneously adjusting the gates to various angles of inclination so that the water pressure against the wheel may be regulated.

With these and other objects in view, the invention consists in the novel combination and arrangement of parts which will be fully set forth in the following specification and accompanying drawings, in which:

Figure 1 is a top plan view partly in section of this improved water wheel and the support therefor. Fig. 2 is a longitudinal sectional view on line 2—2 of Fig. 1. Fig. 3 is a fragmentary side elevation of Fig. 1, showing the driving gears for the various appliances, and Fig. 4 is a detail perspective view of one of the gates.

Referring to the drawings by characters of reference, the numeral 1 designates one of the floats supporting the device, while the numeral 2 designates the opposite float. These floats are connected by a suitable bar 3 at their ends and the brace rods 4 and 5 are also connected between the floats to hold the same in parallel relation. These floats are preferably hollow metal tanks provided with pointed ends and mounted on the upper sides at the inner edges of the floats are the bearings 6 in which the shaft of the water wheel 7 is journaled. Mounted on one end of the shaft 7 is a gear 8 meshing with a pinion 9 which is carried on the shaft 10 which in turn is journaled in suitable bearings 11 on the float 2. It is to be understood that this shaft 10 may be connected to an electric generator or any other power generating device so that the power taken from the water wheel may be readily used.

The water wheel above referred to comprises a hub 12 provided with a plurality of radiating fins 13 and these fins are connected at their ends to the disks 14 and it will be noted upon reference to Fig. 1 that the length of the fins 13 is such as to bring the disks into close proximity to the inner sides of the float, thereby avoiding the escape of water around the wheel and between the floats.

Formed in the forward ends of the float are suitable pockets 15 in which the fins or gates 16 are slidably mounted so that when the same are drawn outwardly as shown in Fig. 1, the greater volume of water will be driven against the wheel. In order to further confine the water driven against the wheel, there is secured to the under side of each float a suitable bearing in which the shaft 17 is journaled and mounted on this shaft is a fin or gate 18, the forward or free end of which has connected thereto as at 19, an adjusting rod 20, the upper end of which is screw threaded and passes through the threaded sleeve 21 which carries at its upper end a bevel gear 22 meshing with the bevel gear 23 mounted on the shaft 24 which extends to one of the floats and through a bearing thereon and is provided with a hand wheel 25. In this way it will be readily seen that an operator in the float on the side of the hand wheel may readily adjust the fin 18 to various depths so that the water will be directed against the fins 13 of the wheel. Extending forwardly from the extreme forward ends of the floats are the bars 26 which converge and are connected together at their forward ends and mounted between these bars are the gates 27 comprising a flat piece of metal 28 having secured thereto the rod 29 by suitable clamps 30. The lower end of the rod is extended and journaled in the lowermost bar while the upper end of the rod is extended and journaled in the uppermost bar and provided with a sprocket wheel 31 around which a suitable adjusting chain 32 passes. This adjusting chain passes to a suitable hand wheel mounted in one of the floats and preferably to one in which the hand wheel 25 is mounted so that the operator may readily set the gate 27 to various degrees of inclination with relation to the bars 26 and thus control the amount of water flowing against the wheel. The device is anchored or moored in the stream by a suitable cable or rope 33, the forward end of which is connected to a pile or any other suitable anchoring member 34 and it will thus be seen that the device will be held against movement while the splashing or rushing of the water beneath the wheel will cause the same to revolve and thus transmit the power to the various generating devices.

From the foregoing it will be evident that a particularly simple and efficient power wheel is provided which may readily be set in motion and wherein the volume of water rushing against the same may be controlled so as to vary the speed and power generated thereby.

While in the foregoing there has been shown and described the preferred embodiment of this invention, it is to be understood that such changes may be made in the combination and arrangement of parts as will fall within the spirit and scope of the appended claims.

What is claimed is:

1. In a water wheel, floats, a shaft rotatably mounted on the floats, a water wheel mounted on the shaft, between the floats, adjustable means to direct the water against the water wheel and also to prevent the passage of floating objects through the wheel, and power transmitting means on the shaft.

2. A water wheel comprising a pair of floats held in spaced parallel relation, a shaft journaled between the floats, a water wheel mounted on the shaft, adjustable fins directing the water against the water wheel and preventing floating objects from entering said wheel, and power transmitting means at the end of the shaft.

3. A water wheel including a pair of spaced parallel floats, bars holding said floats in their spaced relation, a shaft journaled on the floats, a water wheel mounted on the shaft and arranged to drive the same, power transmitting means at one end of the shaft, fins directing the water against the water wheel and means to prevent floating objects from entering the water wheel and to control the flow of water against the wheel.

4. In a device of the character described, a pair of spaced parallel floats, bars holding said floats in their spaced relation, a shaft journaled on each float, a water wheel mounted on the shaft between the floats and occupying the entire space therebetween, a vertical adjustable trough beneath the water wheel to direct the water against the water wheel, fins at the forward ends of the floats directing the water against the water wheel and gates at the forward ends of the floats adapted to be set to prevent floating objects from entering the device.

5. A device of the character described comprising a pair of floats, bars holding said floats in spaced parallel relation, forwardly extending converging bars on the upper and lower sides of the floats, gates mounted between the bars to prevent floating objects from entering the device, a shaft journaled between the floats, a water wheel mounted on said shaft, power transmitting means at one end of the shaft, a trough pivoted between the floats and to their under sides, said trough movable beneath the water wheel, a threaded rod pivoted to the forward end of the trough, a sleeve stationary above the trough and in front of the water wheel, said sleeve being adapted to receive the threaded end of the rod and means to rotate the sleeve whereby the trough is adjusted.

In testimony whereof I affix my signature in presence of two witnesses.

ALBERT P. O. MANICKE.

Witnesses:
KARL M. ECKHARDT,
OTTO REHFUSS.

Copies of this patent may be obtained for five cents each, by addressing the "Commissioner of Patents, Washington, D. C."